(No Model.)

D. W. KETCHUM.
TURPENTINE BOX.

No. 499,388. Patented June 13, 1893.

Witnesses:
Chas. E. Gaylord.
Clifford N. White.

Inventor:
David W. Ketchum,
By Dyrenforth & Dyrenforth,
Attys.

THE NORRIS PETERS CO., PHOTO-LITHO., WASHINGTON, D. C.

UNITED STATES PATENT OFFICE.

DAVID W. KETCHUM, OF EVANSTON, ASSIGNOR TO THE STAR ROSIN COMPANY, OF CHICAGO, ILLINOIS.

TURPENTINE-BOX.

SPECIFICATION forming part of Letters Patent No. 499,388, dated June 13, 1893.

Application filed February 2, 1893. Serial No. 460,737. (No model.)

*To all whom it may concern:*

Be it known that I, DAVID W. KETCHUM, a citizen of the United States, residing at Evanston, in the county of Cook and State of Illinois, have invented a new and useful Improvement in Turpentine-Boxes, of which the following is a specification.

A common method of gathering turpentine consists in cutting a so-called box in the trunk of the pine tree, near its base, and allowing the sap of the tree, or crude turpentine, to ooze into it, whence it is removed, from time to time, by dipping. This box serves the purpose of a receptacle for the turpentine, until the product of the tree (at least from the side thereof in which the box is provided) is exhausted; and to produce adequately free flow of the sap, it is customary periodically to "chip" the tree, an operation which consists in scraping or cutting it across the top of the box, to produce a wound, as it were, as often as the pores become clogged, as they do in time at each "chip." The product of the first season's yield of the tree is a white, or almost white, turpentine, termed "virgin;" and with each successive season of gathering the product becomes darker and of consequent inferior grade. This darkening effect is attributal to the tar which appears to gather in the heart of the tree, into which the box is cut, and from which the tar appears to exude more and more copiously each season.

The object of my invention is to greatly facilitate the gathering of turpentine from the pine tree and at the same time to obtain a uniform product, or "virgin" turpentine, at each season wherein a crop is gathered. This I accomplish by providing a separate box or receptacle of a construction adapting it to be conveniently fastened to the tree in position to receive the turpentine as it oozes therefrom and to be removed, at will, for adjustment at different altitudes on the tree at which incisions are made, from time to time, or at the beginning of each season, to form outlets for the sap.

By my improvement the incision for the outlet of the flow need be only shallow, not extending to a greater depth than that of the sap-wood and avoiding cutting into the heart of the tree. Thus the sap, however long the tree may be "cultivated," is never contaminated with the tar, and is, therefore, always of the "virgin" quality.

Figure 1:
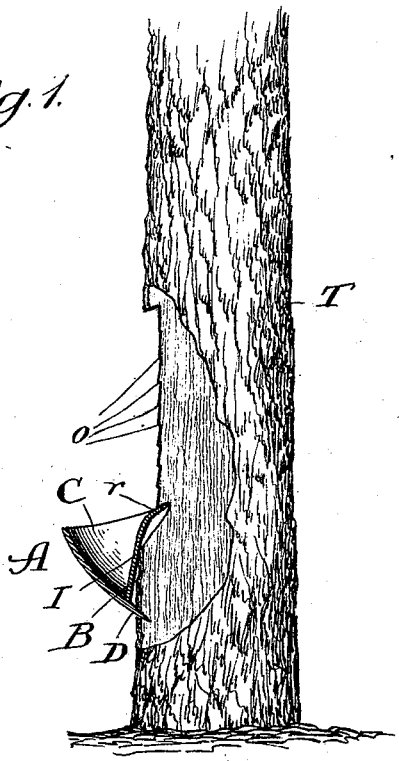
Figure 2:
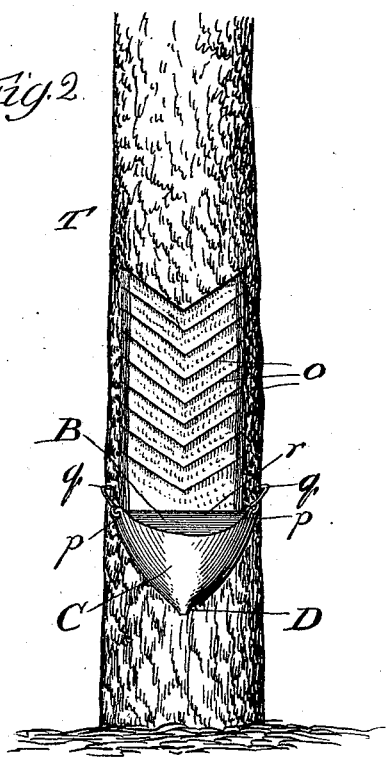
Figure 3:
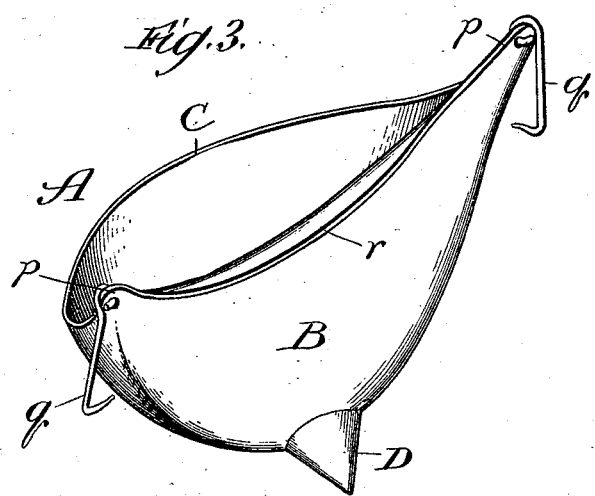

In the accompanying drawings, Figure 1 is a broken and partly sectional view in side elevation representing the trunk of a pine-tree having my improved box, applied to it, and illustrating the chippings made periodically at intervals above the plane at which the box is initially applied. Fig. 2 is a view of the same in front elevation, showing the means I prefer to employ for removably fastening the box in place. Fig. 3 is an enlarged perspective view of my improved box.

A is the box, which is best formed of metal by casting in the desired shape, whereby its back B is made to conform, more or less, to the transverse contour of a pine-tree T, and is provided at its upper edge with a backward extending lip $r$, for a purpose hereinafter described. From the back, the bowl-portion C, or body, of the box extends in curved form, at a somewhat acute angle outward, to adapt it to permit the contents to be readily dipped with the usual dipper or spoon employed for the purpose. At the center of the angle of junction between the back B and bowl C is a toe D, preferably of the V-shape illustrated, and extending at a suitable angle from the base of the box.

Suitable means for fastening the box to the tree should be provided, and the best known to me for the purpose are shown in the drawings and comprise hooks $q$, formed preferably of somewhat flexible metal, loosely fastened at one end in perforated ears $p$, forming the opposite terminations of the lip $r$, and so bent at their opposite ends, where they are pointed, as to adapt them to be driven in a somewhat forward direction into the trunk of the tree and thereby firmly hold the box in place.

The simplest way to fasten the box would be to nail it to the tree; but this is objectionable by reason of the difficulty of removing the box, and of the danger of the nails being allowed to remain in the wood, where they would be liable to injure the saws when the wood, after its turpentine product has been exhausted, is worked into lumber.

To apply my improvement, an incision I is made in the trunk of the tree near its base to a depth of, say, an inch to one and one-half inches, which should, by preference, be undercut at its upper end to form what is known as a "shade-streak," whereby the wood above it affords a projecting hood for protection against the sun, wind, rain, and the like, striking the point of exudation, and whereby a countersink is afforded into which to insert the lip on the box. Above the incision I are indicated the "chippings" o, shown as eight in number, and which are formed at intervals of one week, or thereabout, for the purpose of producing new wounds across the face of the tree from the top of the incision upward to facilitate the flow of the sap.

To apply the box in its operative position after the incision I has been cut, the lip r is inserted and, as will be seen, tends to direct the flow of sap into the bowl C; and the toe D enters a notch formed to receive it at a proper point in the trunk. Thus the box is sustained in place; but to insure prevention of its unintentional dislodgement, as by the wind or other accident, the fastenings q are provided, and are driven into the tree in the manner represented in Fig. 2.

The eight chippings o illustrated are supposed to be all that are required in gathering the crop during two months of one season. Thereafter a new incision I is made above, or in, the uppermost of the chippings o and the box A is applied and utilized and the other described proceedings are carried on in the manner already stated.

By my improvement, as will be seen, the turpentine may be gathered each season from a different elevation on the trunk of a tree, until either the top is reached, or, at least, such point thereon at which the turpentine product may still be dipped with adequate convenience.

What I claim as new, and desire to secure by Letters Patent, is—

1. A turpentine-box A to be supported on the trunk of a tree T, said box having a back B adapted, at its upper end, to enter an incision in the trunk, a bowl-portion C, and a toe D on the base of the box, substantially as and for the purpose set forth.

2. A turpentine-box A, comprising, in combination, a back B provided with a lip r to enter an incision in the trunk of a tree T, a bowl-portion C, hooks q, at opposite lateral ends of the box, and a toe D on the base of the box, substantially as and for the purpose set forth.

DAVID W. KETCHUM.

In presence of—
J. N. HANSON,
W. N. WILLIAMS.